United States Patent Office.

FRIEDRICH BARDELE, OF MILWAUKEE, WISCONSIN, ASSIGNOR OF ONE-HALF TO FRANK BERGER, OF SAME PLACE.

RAT-EXTERMINATOR.

SPECIFICATION forming part of Letters Patent No. 582,253, dated May 11, 1897.

Application filed January 18, 1897. Serial No. 619,651. (No specimens.)

*To all whom it may concern:*

Be it known that I, FRIEDRICH BARDELE, a citizen of the United States, residing at Milwaukee, in the county of Milwaukee and State of Wisconsin, have invented new and useful Improvements in Non-Poisonous Compounds for the Extinction of Rats, of which the following is a specification.

My invention relates to improvements in non-poisonous compounds for the extinction of rats.

The object of my invention is to provide a compound which may be handled with perfect safety, but which will be effective in destroying the vermin.

In the preparation of my compound I mix together a quantity of ground cork, salt, and pepper or other thirst-inducing substance and a palatable plastic food, such as butter or lard mixed with flour and sugar, whereby the rats are induced to eat the mixture. The salt and pepper produce thirst, and the rats at once seek water, which, when taken into the system, causes the cork to swell and destroy the rats. The rats in seeking the water will usually leave the building where the compound is placed and die elsewhere.

I prefer to prepare my compound in the following proportions: With four ounces of the ground cork I mix five and one-half ounces of butter, an equal quantity of lard, a one-half ounce of mixed salt and pepper, and a one-half ounce of mixed flour and sugar. It is found that the rats devour this mixture with great eagerness and that it is as fatal as a virulent poison.

Having thus described my invention, what I claim as new, and desire to secure by Letters Patent, is—

A non-poisonous compound for exterminating rats, comprising a mixture of ground cork, with a thirst-producing substance, such as salt or pepper, and a palatable plastic food, adapted to attract the vermin, substantially as described.

In testimony whereof I affix my signature in the presence of two witnesses.

FRIEDRICH BARDELE.

Witnesses:
 JAS. B. ERWIN,
 LEVERETT C. WHEELER.